United States Patent
Chang

(10) Patent No.: US 10,402,189 B2
(45) Date of Patent: Sep. 3, 2019

(54) ELECTRONIC APPARATUS AND FIRMWARE UPDATE METHOD THEREOF

(71) Applicant: Wistron Corporation, New Taipei (TW)

(72) Inventor: Pao-Shun Chang, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 15/942,553

(22) Filed: Apr. 1, 2018

(65) Prior Publication Data

US 2019/0227783 A1 Jul. 25, 2019

(30) Foreign Application Priority Data

Jan. 23, 2018 (TW) .............................. 107102263 A

(51) Int. Cl.
  *G06F 8/65* (2018.01)
  *G06F 21/57* (2013.01)
  *H04L 12/12* (2006.01)
  *G06F 1/3203* (2019.01)
  *H04L 29/06* (2006.01)
  *G06F 8/61* (2018.01)

(52) U.S. Cl.
  CPC .............. *G06F 8/65* (2013.01); *G06F 1/3203* (2013.01); *G06F 8/61* (2013.01); *G06F 21/572* (2013.01); *H04L 12/12* (2013.01); *H04L 63/12* (2013.01)

(58) Field of Classification Search
  CPC ....................................... G06F 8/65; G06F 8/61
  USPC .................................. 717/168–173, 175–178
  See application file for complete search history.

(56) References Cited

U.S. PATENT DOCUMENTS

| 5,826,015 A | 10/1998 | Schmidt | |
| 7,360,074 B2 | 4/2008 | Chan et al. | |
| 7,809,811 B1 * | 10/2010 | Rao ....................... | G06F 15/173 709/221 |
| 7,953,901 B2 * | 5/2011 | Nishikawa ................ | G06F 8/65 710/10 |
| 8,185,886 B2 * | 5/2012 | Rothman .................. | G06F 8/65 717/171 |

(Continued)

OTHER PUBLICATIONS

Evan Glick, "A Remote System Update Mechanization (R S U M)" (Year: 2010).*

(Continued)

*Primary Examiner* — Phillip H Nguyen
(74) *Attorney, Agent, or Firm* — JCIPRNET

(57) ABSTRACT

An electronic apparatus and a firmware update method thereof are provided. The electronic apparatus includes a firmware storage device, a microcontroller and a network interface module. Firmware is stored in the firmware storage device, and the microcontroller is coupled to the firmware storage device. The network interface module is coupled to the microcontroller, receives a packet from a remote server via a network, and determines whether the packet conforms to a specific format by determining whether the packet is a Wake-on-LAN packet and whether the packet includes a firmware update command. If the packet conforms to the specific format, the microcontroller obtains firmware update data provided by the remote server through the network interface module, to refresh the firmware stored in the firmware storage device by using the firmware update data.

13 Claims, 5 Drawing Sheets

(56) References Cited

U.S. PATENT DOCUMENTS

| | | | | |
|---|---|---|---|---|
| 8,589,907 B2* | 11/2013 | Chung | ............... | H04L 41/082 709/221 |
| 8,869,131 B2* | 10/2014 | Wang | ............... | G06F 8/65 717/170 |
| 2004/0103412 A1* | 5/2004 | Rao | ............... | G06F 8/65 717/171 |
| 2011/0078299 A1* | 3/2011 | Nagapudi | ............... | H04L 12/12 709/223 |
| 2011/0202983 A1* | 8/2011 | Pope | ............... | G06F 21/572 726/7 |
| 2013/0219398 A1* | 8/2013 | Karpa | ............... | G06F 8/65 718/102 |
| 2015/0170145 A1* | 6/2015 | Patel | ............... | G06F 8/20 705/44 |

OTHER PUBLICATIONS

"Office Action of Taiwan Counterpart Application", dated Jul. 27, 2018, p. 1-p. 7.

* cited by examiner

ELECTRONIC APPARATUS AND FIRMWARE UPDATE METHOD THEREOF

CROSS-REFERENCE TO RELATED APPLICATION

This application claims the priority benefit of Taiwan application serial no. 107102263, filed on Jan. 23, 2018. The entirety of the above-mentioned patent application is hereby incorporated by reference herein and made a part of this specification.

BACKGROUND

Technical Field

The disclosure relates to an electronic apparatus, particularly to an electronic apparatus and a firmware update method thereof.

Related Art

A computer system generally includes firmware for controlling various hardware components. The so-called firmware generally refers to software embedded in the hardware components of apparatuses. The firmware serves as a communication bridge between an operating system and the hardware components, and therefore plays a quite significant role in the computer system. As is well known, if the firmware in the computer system is damaged, the computer system may not be able to boot normally or some functions of the computer system may not work normally. At this moment, the firmware needs to be updated and repaired, otherwise the computer system cannot operate normally any longer. In another respect, by performing a version update on the firmware, conditions of the computer system, such as operating efficiency and stability thereof, can be adjusted. In other words, applying a suitable version of firmware can ensure the optimum operating performance of a hardware device. That is, firmware update and repair are very important for operation of the hardware device.

Generally, in the case where the operating system operates normally, firmware update may be performed through a specific software component. However, when the computer system cannot boot normally or the operating system does not operate normally, the firmware update cannot be performed through the specific software component. For example, when a basic input/output system (BIOS) is damaged or cannot boot normally due to incompatibility with existing hardware, update and repair of the BIOS cannot be performed through a specific software component under the condition that the operating system operates normally. At this moment, all a user can do is to send the machine to a maintenance and repair unit, and maintenance and repair people have to disassemble the machine and use special burning equipment to re-burn the firmware. As is known, the above firmware maintenance and repair process is time-consuming, labor-intensive and has complicated steps. Much inconvenience is caused to both the user and the maintenance and repair unit, and maintenance and repair costs are required.

SUMMARY

In view of the above, embodiments of the disclosure propose an electronic apparatus and a firmware update method thereof, by which a convenient, time-saving and cost-saving way of updating firmware is provided.

Embodiments of the disclosure provide an electronic apparatus including a firmware storage device, a microcontroller and a network interface module. The firmware storage device stores firmware therein, and the microcontroller is coupled to the firmware storage device. The network interface module is coupled to the microcontroller, receives a packet from a remote server via a network, and determines whether the packet conforms to a specific format by determining whether the packet is a Wake-on-LAN packet and whether the packet includes a firmware update command. If the packet conforms to the specific format, the microcontroller obtains firmware update data provided by the remote server through the network interface module, to refresh the firmware stored in the firmware storage device by using the firmware update data.

In one embodiment of the disclosure, while the electronic apparatus operates in a power saving state, the packet is received by the network interface module.

In one embodiment of the disclosure, if the packet is the Wake-on-LAN packet and does not include the firmware update command, the microcontroller controls the electronic apparatus to switch from operating in the power saving state to operating in a working state.

In one embodiment of the disclosure, if the packet is the Wake-on-LAN packet and includes the firmware update command, the network interface module continues to receive the firmware update data provided by the remote server, and the network interface module provides the firmware update data to the microcontroller.

In one embodiment of the disclosure, if the packet is the Wake-on-LAN packet and includes the firmware update command, the microcontroller further verifies the packet. If the packet passes the verification, the network interface module continues to receive the firmware update data provided by the remote server.

In one embodiment of the disclosure, the microcontroller obtains verification data in the packet and reads a firmware verification code from the firmware. The microcontroller determines whether the firmware verification code matches the verification data in the packet to verify the packet.

In one embodiment of the disclosure, the firmware includes a basic input/output system, and the microcontroller includes an embedded controller.

From another point of view, embodiments of the disclosure provide a firmware update method adapted to an electronic apparatus, the electronic apparatus including a firmware storage device, a network interface module and a microcontroller. The firmware update method includes the following steps. A packet is received from a remote server by the network interface module. Whether the packet conforms to a specific format is determined by the network interface module by determining whether the packet is a Wake-on-LAN packet and whether the packet includes a firmware update command. If the packet conforms to the specific format, firmware update data provided by the remote server is obtained by the microcontroller through the network interface module. Firmware stored in the firmware storage device is refreshed by the microcontroller by using the firmware update data.

Based on the above, in the embodiments of the disclosure, the network interface module of the electronic apparatus may receive a packet via a network in a power-off state or a power-saving state, and determine whether the format and content of the packet conform to a specific format. Here, the network interface module may determine whether the packet conforms to the specific format by determining whether the packet is the Wake-on-LAN packet and whether the packet includes the firmware update command. If the received packet conforms to the specific format, the microcontroller of the electronic apparatus may obtain the firmware update data provided by the remote server (i.e., the source of the packet), and the microcontroller is driven to refresh the firmware in the firmware storage device by using the firmware update data. In this way, even if the electronic apparatus cannot operate normally or cannot boot, the microcontroller thereof can still complete the tasks of updating and repairing the firmware, thus considerably reducing the cost and time for maintaining and repairing or updating the firmware.

To make the above features and advantages of the disclosure more comprehensible, several embodiments accompanied with drawings are described in detail as follows.

DETAILED DESCRIPTION OF DISCLOSED EMBODIMENTS

Figure 1:
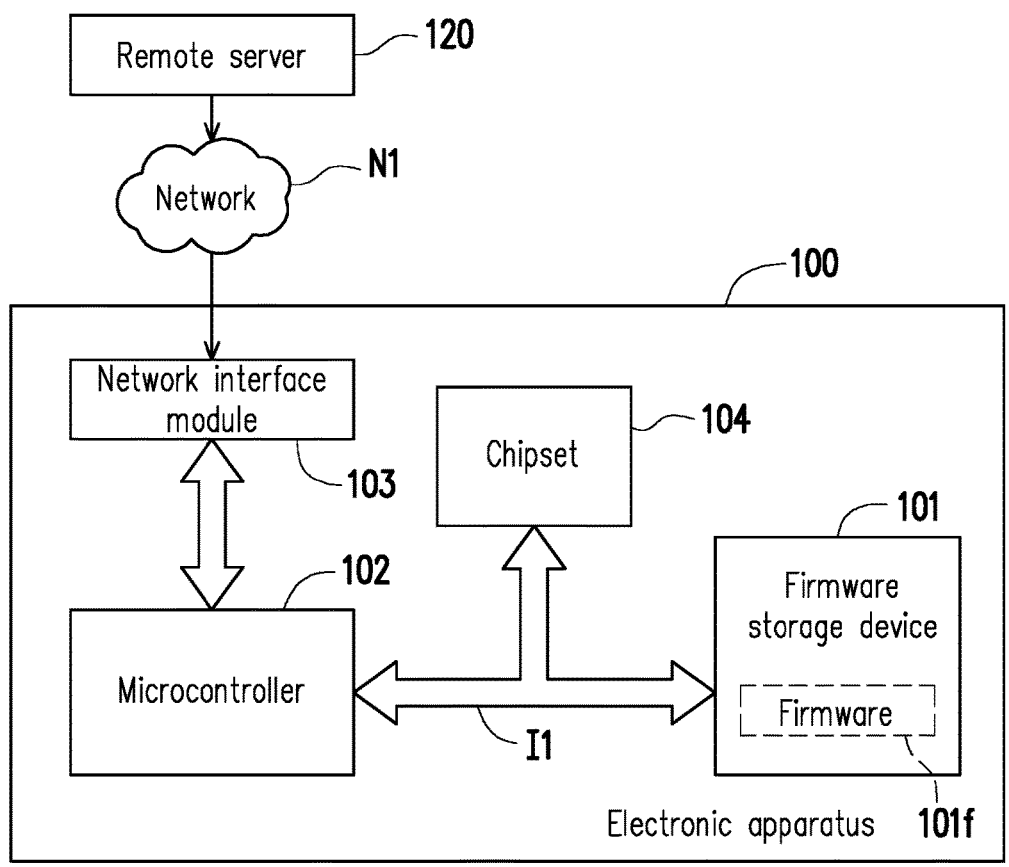
FIG. 1 is a block diagram illustrating an electronic apparatus according to one embodiment of the disclosure.

Some embodiments of the disclosure will be hereinafter described in detail with reference to the accompanying drawings. In the following description, the same reference numerals in different drawings represent the same or similar elements. These embodiments are only a part of the disclosure and do not disclose all of the possible implementations of the disclosure. More specifically, these embodiments are only examples of the electronic apparatus and the firmware update method within the scope of the claims of the disclosure.

FIG. 1 is a block diagram illustrating an electronic apparatus according to one embodiment of the disclosure. Referring to FIG. 1, an electronic apparatus 100 of the present embodiment is, for example but not limited to, a desktop computer, a notebook computer, a tablet computer, a smartphone or the like. The electronic apparatus 100 may include a firmware storage device 101, a microcontroller 102, a network interface module 103 and a chipset 104. In addition, the electronic apparatus 100 may also include a central processing unit (CPU) (not illustrated) coupled to the chipset 104.

The firmware storage device 101 stores firmware 101f therein. Specifically, the firmware 101f may be stored in a storage element of the firmware storage device 101 to make it easier for a specific processing circuit to access/execute programming codes of the firmware 101f. The firmware storage device 101 may be a microcontroller having the firmware 101f embedded therein, or a storage element simply for storing the firmware 101f. For example, the firmware storage device 101 may be an embedded controller, any other type of microcontroller, a basic input/output unit or the like, in the electronic apparatus 100.

The firmware storage device 101 may include a memory element configured to store the firmware 101f. Examples of the memory element include a read only memory (ROM), a programmable ROM (PROM), an erasable programmable read only memory (EPROM), an electrically erasable programmable read only memory (EEPROM), a non-volatile memory such as a NAND-type flash memory or a NOR-type flash memory, and so on. The disclosure is not limited thereto. In addition, the firmware 101f may be a basic input/output system (BIOS), an extensible firmware interface (EFI) BIOS, a unified extensible firmware interface (UEFI) BIOS, other firmware programming codes or the like. The disclosure is not limited thereto.

The microcontroller 102 may be coupled to the firmware storage device 101 via a transmission interface I1. The transmission interface I1 is, for example, a serial peripheral interface (SPI) bus or a low pin count (LPC) bus. The microcontroller 102 may be an embedded controller (EC) configured to manage a power state of the electronic apparatus 100, or other control chip capable of computing. The chipset 104 may be a southbridge chip or a platform controller hub (PCH) or the like.

The network interface module 103 may support wired or wireless network communication protocol to enable the electronic apparatus 100 to connect to a network N1. The network interface module 103 may be coupled to the microcontroller 102 via, for example, an I²C interface or other transmission interface. The network interface module 103 may be a physical Ethernet card and/or wireless network card and a networking chip used therein. In the present embodiment, the electronic apparatus 100 may communicate with a remote server 120 via the network N1 through the network interface module 103. It is worth mentioning that, when the electronic apparatus 100 is operating in a power saving state, the network interface module 103 still continuously operate normally to detect and receive packets from the network N1.

In embodiments of the disclosure, when the remote server 120 intends to perform a remote firmware update on the electronic apparatus 100, the remote server 120 may send, through the network N1, a packet for updating firmware. In response to receipt of a packet conforming to a specific format, the network interface module 103 of the electronic apparatus 100 triggers the microcontroller 102 to perform the firmware update. In this way, without participation of a CPU and an operating system, the remote server 120 is capable of controlling the electronic apparatus 100 to update and repair the firmware 101f. More specifically, even if the electronic apparatus 100 cannot boot normally, since the network interface module 103 can continuously receive packets from the network N1 and trigger the microcontroller 102 to refresh an accessible medium of the firmware storage device 101, remote update of the firmware 101f can be completed in a power-off state.

Figure 2:
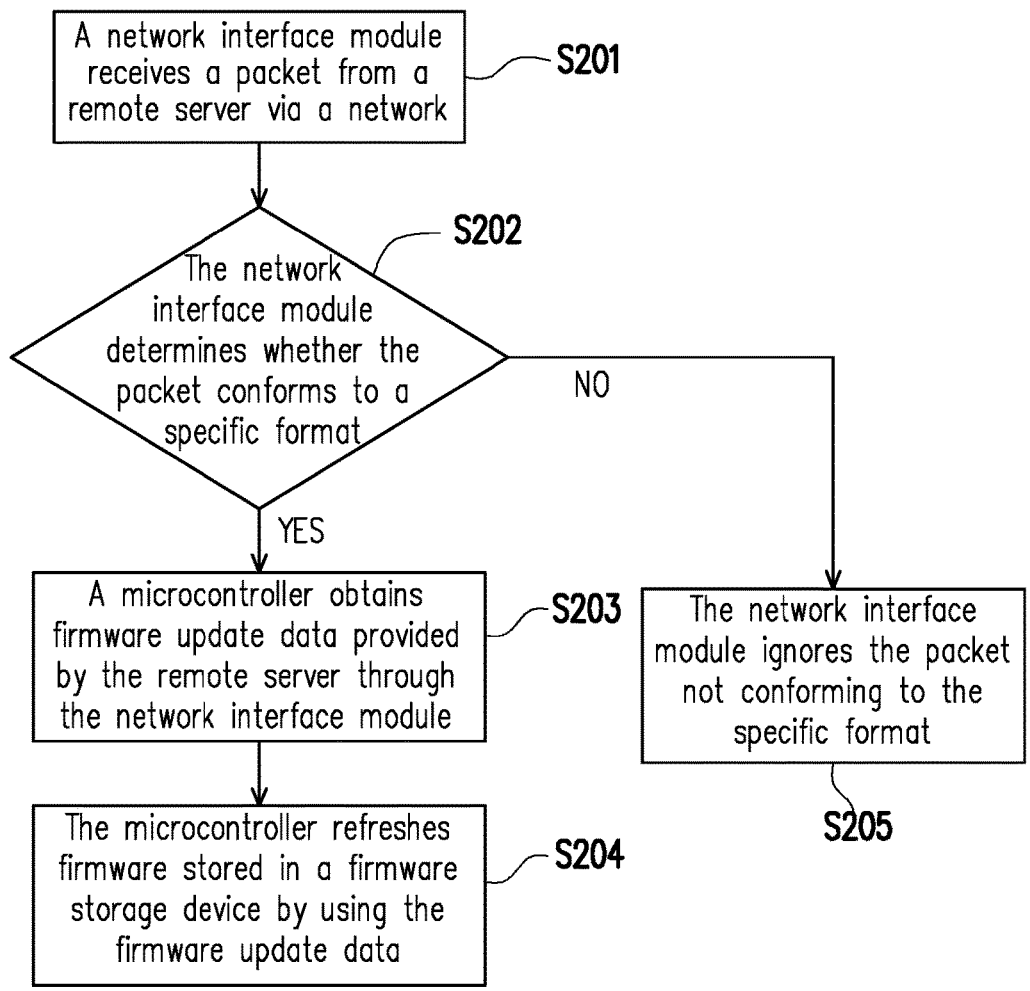
FIG. 2 is a flowchart illustrating a firmware update method according to one embodiment of the disclosure.

FIG. 2 is a flowchart illustrating a firmware update method according to one embodiment of the disclosure. Referring to FIG. 2, the method of the present embodiment is adapted to the electronic apparatus 100 in the aforesaid embodiment. In the following, detailed steps of the firmware update method of the present embodiment are explained with reference to the elements in the electronic apparatus 100.

In step S201, the network interface module 103 receives a packet from the remote server 120 via the network N1. This packet may be a unicast packet or a broadcast packet. The disclosure is not limited thereto. In step S202, the network interface module 103 determines whether the packet conforms to a specific format. For example, the network interface module 103 may learn whether the packet conforms to the specific format by determining whether the content of the packet contains data defined by the specific format.

If the packet conforms to the specific format (YES in step S202), in step S203, the microcontroller 102 obtains firmware update data provided by the remote server 120 through the network interface module 103. Then, in step S204, the microcontroller 102 refreshes the firmware 101*f* stored in the firmware storage device 101 by using the firmware update data. In one embodiment, the microcontroller 102 may erase part or all of the firmware data existing in the firmware storage device 101 and re-write the firmware update data to the firmware storage device 101, so as to refresh the firmware 101*f* stored in the firmware storage device 101. On the other hand, if the packet does not conform to the specific format (NO in step S202), in step S205, the network interface module 103 ignores the packet not conforming to the specific format and the operation of updating the firmware 101*f* will not be triggered. In this way, even if the electronic apparatus 100 cannot boot normally or the operating system (OS) cannot operate normally, since there is no participation of the operating system and the CPU in the firmware update process of the present embodiment, the remote server 120 can still control the electronic apparatus 100 to perform the firmware update.

Figure 3:
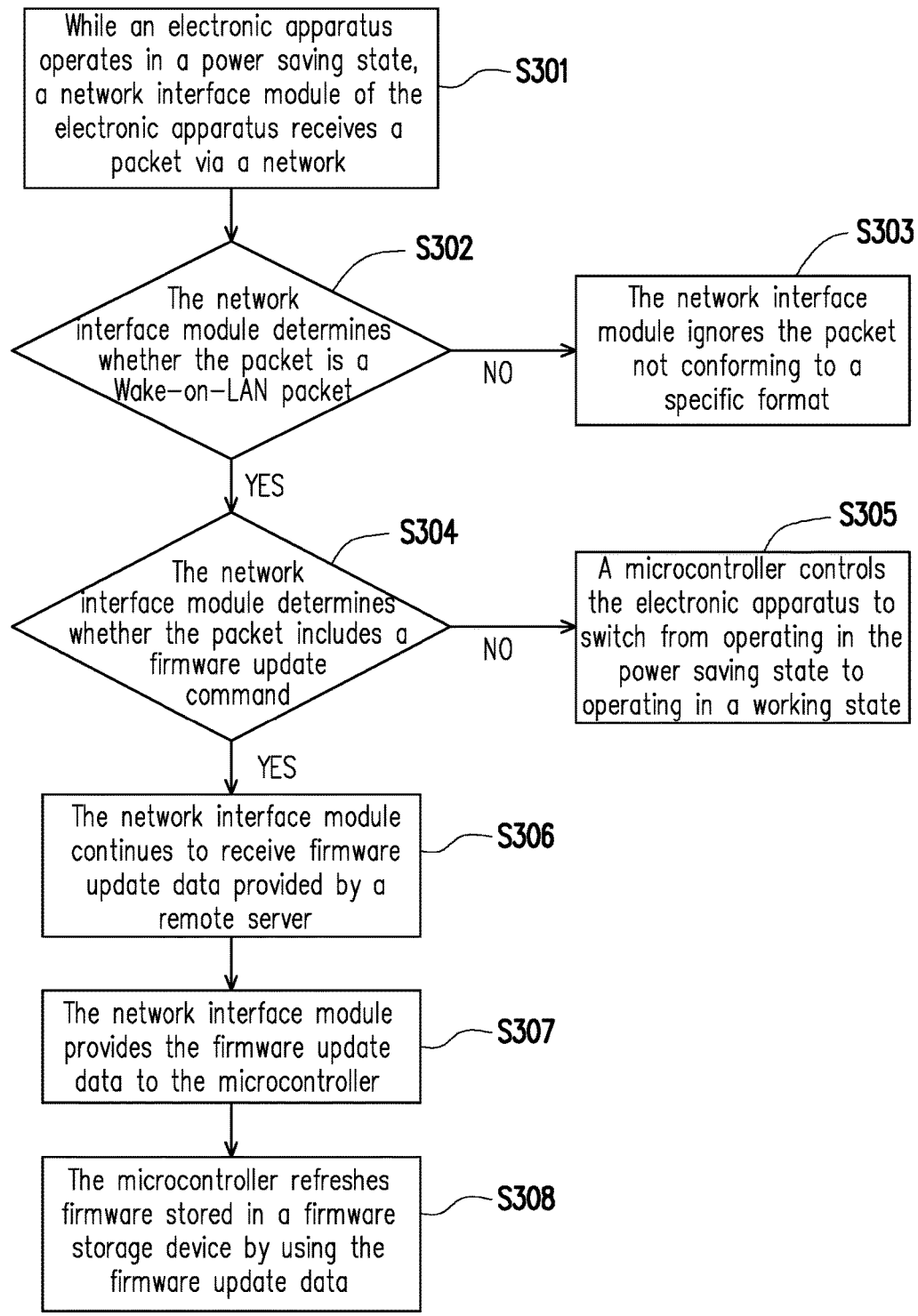
FIG. 3 is a flowchart illustrating a firmware update method according to one embodiment of the disclosure.

FIG. 3 is a flowchart illustrating a firmware update method according to one embodiment of the disclosure. Referring to FIG. 3, the method of the present embodiment is adapted to the electronic apparatus 100 in the aforesaid embodiment. In the following, detailed steps of the firmware update method of the present embodiment are explained with reference to the elements in the electronic apparatus 100.

It should be noted that, the embodiment shown in FIG. 3 will be explained using an example in which the electronic apparatus 100 has operated in the power saving state from the beginning. Herein, the terms "power saving state" and "working state" mentioned in the present embodiment may be power states defined by various standard specifications for power supplies (e.g., the Advanced Configuration and Power Interface (ACPI) standard). The aforesaid power saving state may be a standby state, a sleep date, a communication standby state or a power-off state defined by various standard specifications for power supplies. For example, in accordance with the ACPI standard, the power states include states S0 to S5, wherein state S0 refers to the so-called working state, and states Si to S5 refer to power saving states providing different levels of power saving for a computer system. For example, the power saving state mentioned in the following embodiment may be state S3 (sleep state) or state S5 (power-off state) defined by the ACPI standard.

In step S301, while the electronic apparatus 100 operates in the power saving state, the network interface module 103 receives a packet via the network N1. In step S302, the network interface module 103 determines whether the packet is a Wake-on-LAN (WOL) packet. The Wake-on-LAN packet (also called a magic packet) is a special packet for waking up an electronic apparatus in the power saving state. In detail, the Wake-on-LAN packet is a type of broadcast packet which can be transmitted using a connectionless communication protocol. The aforesaid communication protocol is generally the User Datagram Protocol (UDP). A message format of the Wake-on-LAN packet has predefined content. The message format of the Wake-on-LAN packet generally starts with six consecutive "FF" (6 bytes in total), followed by sixteen media access control (MAC) addresses (16*6=96 bytes in total). The aforesaid MAC address refers to a MAC address of an electronic apparatus that the remote server 120 attempts to wake up or remotely control.

Figure 4:
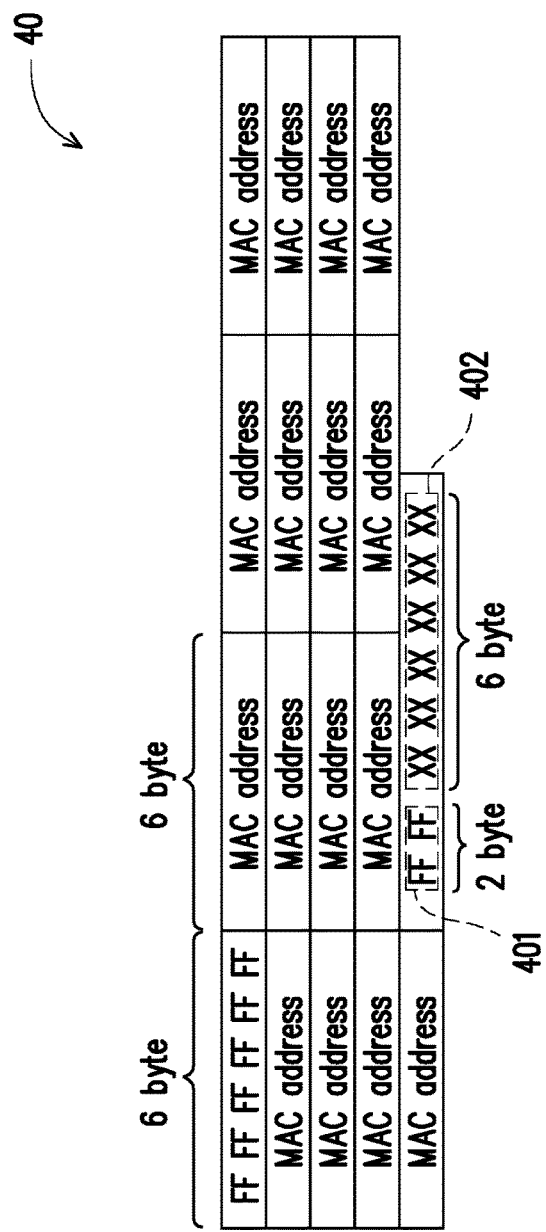
FIG. 4 is a schematic diagram illustrating a packet conforming to a specific format according to one embodiment of the disclosure.

In other words, in one embodiment, the network interface module 103 may receive a broadcast packet broadcast by the remote server 120, and identify whether the broadcast packet is a Wake-on-LAN packet sent to the network interface module 103 itself according to the message format of the Wake-on-LAN packet. For example, FIG. 4 is a schematic diagram illustrating a packet conforming to a specific format according to one embodiment of the disclosure. As shown in FIG. 4, assuming that the packet received by the network interface module 103 includes a packet content 40, the network interface module 103 may determine that the received packet is the Wake-on-LAN packet on the basis of the fact that the packet content 40 contains six consecutive "FF" and sixteen MAC addresses of the network interface module 103 itself.

If the packet is not the Wake-on-LAN packet (NO in step S302), in step S303, the network interface module 103 ignores the packet not conforming to the specific format, and thus neither triggers the microcontroller 102 to wake up the electronic apparatus 100 nor triggers the microcontroller 102 to update the firmware 101*f*.

If the packet is the Wake-on-LAN packet (YES in step S302), in step S304, the network interface module 103 further determines whether the packet includes a firmware update command. According to a predetermined configuration of commands, the network interface module 103 may further determine whether the Wake-on-LAN packet includes the firmware update command. For example, the firmware update command may be "FFFF" of 2 bytes. However, the disclosure is not limited thereto. The firmware update command may be configured depending on actual application conditions. Referring to the example in FIG. 4, in the case where the firmware update command is "FFFF" of 2 bytes, after determining that the received packet is the Wake-on-LAN packet, the network interface module 103 may determine that the packet includes a firmware update command 401 on the basis of the fact that the packet content 40 further contains "FFFF" of 2 bytes.

If the packet is the Wake-on-LAN packet and does not include the firmware update command (NO in step S304), in step S305, the microcontroller 102 controls the electronic apparatus 100 to switch from operating in the power saving state to operating in the working state. In an example in which the microcontroller 102 is an embedded controller, the microcontroller 102 may include a normal wake-up pin and a Wake-on-LAN pin, wherein the normal wake-up pin is, for example, coupled to a peripheral device such as a power button, a keyboard, a touch pad, a mouse or the like, and the Wake-on-LAN pin is coupled to the network interface module 103. When the electronic apparatus 100 is in the power saving state, the microcontroller 102 may wake up the electronic apparatus 100 in the power saving state according to a triggering behavior of the normal wake-up pin and the Wake-on-LAN pin. Here, if the packet is the Wake-on-LAN packet and does not include the firmware update command, the network interface module 103 triggers the microcontroller 102 to wake up the electronic apparatus 100 but does not trigger the microcontroller 102 to update the firmware 101*f*.

If the packet is the Wake-on-LAN packet and includes the firmware update command (YES in step S304), in step S306, the network interface module 103 continues to receive the firmware update data provided by the remote server 120. In step S307, the network interface module 103 provides the firmware update data to the microcontroller 102. Specifically, after the network interface module 103 detects the packet which is the Wake-on-LAN packet and includes the firmware update command, the network interface module 103 continues to receive the firmware update data subsequently transmitted from the remote server 120, and provides the firmware update data to the microcontroller 102.

In one embodiment, the network interface module 103 may temporarily store the firmware update data provided by the remote server 120 in a buffer of the network interface module 103, and notify the microcontroller 102 to retrieve the firmware update data from this buffer. In one alternative embodiment, the network interface module 103 may directly transfer the firmware update data provided by the remote server 120 to the microcontroller 102.

Finally, in step S308, the microcontroller 102 refreshes the firmware 101f stored in the firmware storage device 101 by using the firmware update data. That is, if the packet is the Wake-on-LAN packet and includes the firmware update command, the network interface module 103 does not trigger the microcontroller 102 to wake up the electronic apparatus 100 but triggers the microcontroller 102 to update the firmware 101f.

However, implementation of the disclosure is not limited to the above descriptions, and the content of the aforesaid embodiments may be changed depending on actual needs. For example, in one embodiment of the disclosure, the packet conforming to the specific format is further subjected to verification so that a firmware update is performed in response to receipt of a qualified packet. One embodiment is hereinafter described in detail.

Figure 5:
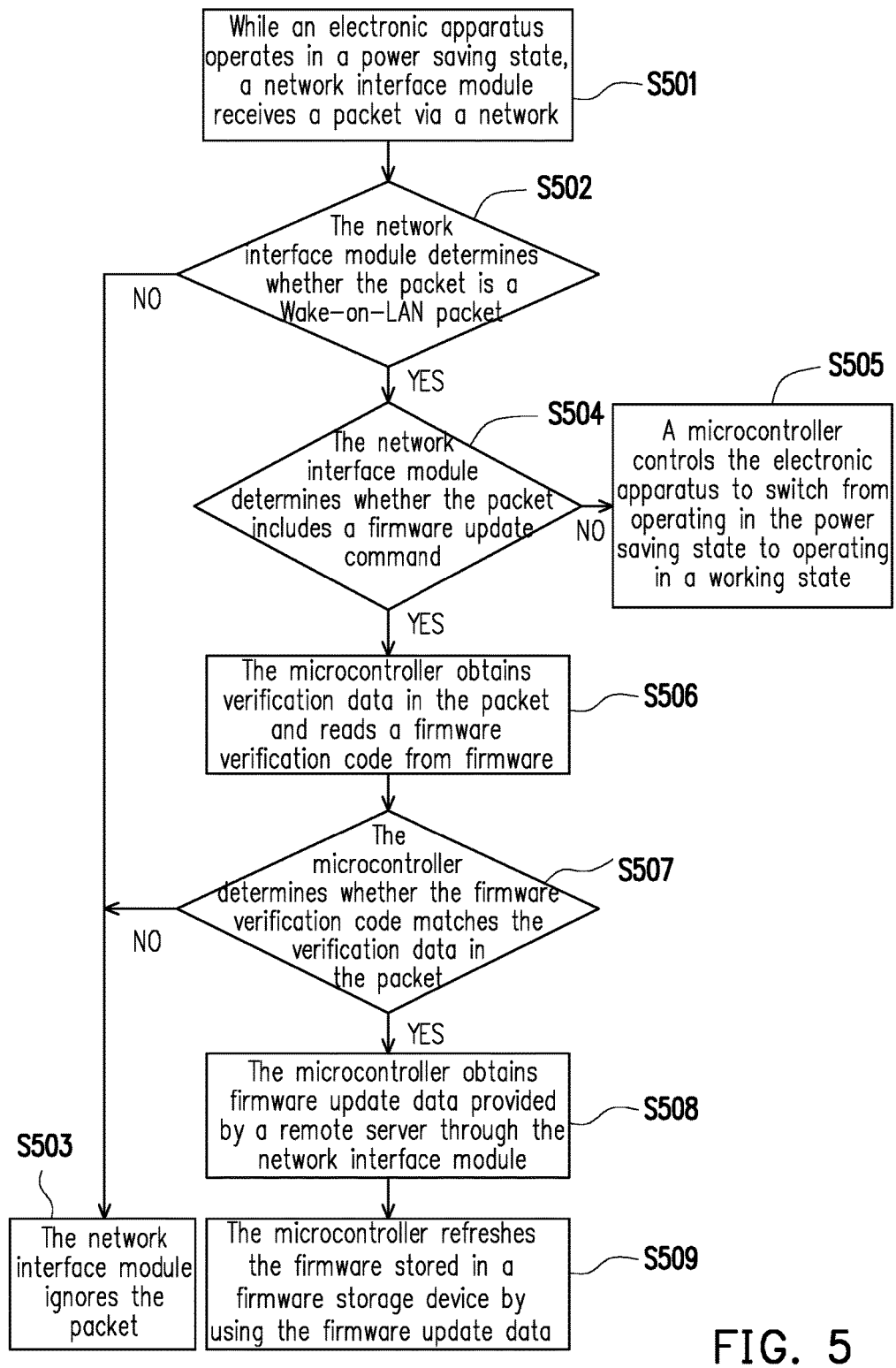
FIG. 5 is a flowchart illustrating a firmware update method according to one embodiment of the disclosure.

FIG. 5 is a flowchart illustrating a firmware update method according to one embodiment of the disclosure. Referring to FIG. 5, the method of the present embodiment is adapted to the electronic apparatus 100 in the aforesaid embodiment. In the following, detailed steps of the firmware update method of the present embodiment are explained with reference to the elements in the electronic apparatus 100. Similarly to the embodiment in FIG. 3, an example will be explained in which the electronic apparatus 100 has operated in the power saving state from the beginning.

In step S501, while the electronic apparatus 100 operates in the power saving state, the network interface module 103 receives a packet via the network N1. In step S502, the network interface module 103 determines whether the packet is a Wake-on-LAN packet. If the packet is not the Wake-on-LAN packet (NO in step S502), in step S503, the network interface module 103 ignores the packet. If the packet is the Wake-on-LAN packet (YES in step S502), in step S504, the network interface module 103 determines whether the packet includes a firmware update command.

If the packet is the Wake-on-LAN packet and does not include the firmware update command (NO in step S504), in step S505, the microcontroller 102 controls the electronic apparatus 100 to switch from operating in the power saving state to operating in the working state. The details of steps S501 to S505 shown in FIG. 5 are similar to steps S301 to S305 shown in FIG. 3 and will not be repeated herein.

It is worth mentioning that, if the packet is the Wake-on-LAN packet and includes the firmware update command (YES in step S504), in step S506, the microcontroller 102 obtains verification data in the packet and reads a firmware verification code from the firmware 101f. In step S507, the microcontroller 102 determines whether the firmware verification code matches the verification data in the packet.

Specifically, in one embodiment, after determining that the packet conforms to the specific format, the network interface module 103 retrieves the verification data from the packet and transmits the verification data from the packet to the microcontroller 102 for verification. The microcontroller 102 may verify legitimacy of the packet by determining whether the verification data in the packet is the same as the firmware verification code. In the example in FIG. 4, the network interface module 103 may transmit verification data 402 (6 bytes in total) in the packet content 40 to the microcontroller 102, and the microcontroller 102 may perform packet verification by comparing the verification data 402 with the firmware verification code in the firmware 101f.

Following the above, to protect the firmware in the electronic apparatus 100 from being destroyed by malicious persons using the packet conforming to the specific format, every time the remote server 120 releases the firmware update data to the electronic apparatus 100, the remote server 120 may provide to the electronic apparatus 100 the firmware verification code together with the firmware update data. Every time the microcontroller 102 updates the firmware 101f, the firmware verification code is written to the firmware storage device 101, together with the firmware update data. Afterwards, when the remote server 120 attempts to update the firmware 101f in the electronic apparatus 100, the packet sent by the remote server 120 should include not only the firmware update command but also the verification data. In this way, the microcontroller 102 may verify the packet by comparing a previously stored firmware verification code with the verification data in the packet, so that a firmware update is performed in response to receipt of a verified packet.

Based on the above, if the firmware verification code does not match the verification data in the packet (NO in step S507), subsequent to step S503, the network interface module 103 ignores this packet and does not trigger the microcontroller 102 to update the firmware 101f. On the other hand, if the firmware verification code matches the verification data in the packet (YES in step S507), in step S508, the microcontroller 102 obtains the firmware update data provided by the remote server 120 through the network interface module 103. In other words, if the packet passes the verification, the microcontroller 102 may notify the network interface module 103 so that the network interface module 103 continues to receive the firmware update data provided by the remote server 120. Finally, in step S509, the microcontroller 102 refreshes the firmware 101f stored in the firmware storage device 101 by using the firmware update data.

In summary, in the embodiments of the disclosure, the remote server is allowed to remotely control the firmware update inside the electronic apparatus via the network. Even if the electronic apparatus cannot boot normally or the operating system thereof cannot operate normally, the network interface module in the electronic apparatus may trigger the microcontroller to perform the firmware update in response to receipt of the packet sent by the remote server which conforms to the specific format. Based on the above, when the firmware in the electronic apparatus malfunctions or is damaged, there is neither a need for the user to send the electronic apparatus to a maintenance and repair unit nor a need for the maintenance and repair unit to disassemble the electronic apparatus and use special burning equipment to repair the firmware of the electronic apparatus. For both the user and the maintenance and repair unit, the maintenance and repair costs are considerably reduced, and the update and repair of firmware are accelerated. In addition, through the packet verification as mentioned in the embodiments of the disclosure, safety of the firmware can be ensured on the premise that the firmware is efficiently updated.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An electronic apparatus comprising:
   a firmware storage device storing firmware;
   a microcontroller coupled to the firmware storage device; and
   a network interface module coupled to the microcontroller, receiving a packet from a remote server via a network, and determining whether the packet conforms to a specific format by determining whether the packet is a Wake-on-LAN packet and comprises a firmware update command,
   wherein if the packet is the Wake-on-LAN packet and comprises the firmware update command, the network interface module does not trigger the microcontroller to wake up the electronic apparatus but trigger the microcontroller to update the firmware, and the microcontroller obtains firmware update data provided by the remote server through the network interface module, to refresh the firmware stored in the firmware storage device by using the firmware update data,
   wherein the firmware comprises a basic input/output system, and the microcontroller comprises an embedded controller configured to manage a power state of a computer system.

2. The electronic apparatus according to claim 1, wherein while the electronic apparatus operates in a power saving state, the packet is received by the network interface module.

3. The electronic apparatus according to claim 2, wherein if the packet is the Wake-on-LAN packet and does not comprise the firmware update command, the microcontroller controls the electronic apparatus to switch from operating in the power saving state to operating in a working state.

4. The electronic apparatus according to claim 2, wherein if the packet is the Wake-on-LAN packet and comprises the firmware update command, the network interface module continues to receive the firmware update data provided by the remote server, and the network interface module provides the firmware update data to the microcontroller.

5. The electronic apparatus according to claim 2, wherein if the packet is the Wake-on-LAN packet and comprises the firmware update command, the microcontroller further verifies the packet,
   wherein if the packet passes the verification, the network interface module continues to receive the firmware update data provided by the remote server.

6. The electronic apparatus according to claim 5, wherein the microcontroller obtains verification data in the packet and reads a firmware verification code from the firmware, and determines whether the firmware verification code matches the verification data in the packet to verify the packet.

7. A firmware update method adapted to an electronic apparatus, the electronic apparatus comprising a firmware storage device, a network interface module and a microcontroller, the firmware update method comprising:
   receiving, by the network interface module, a packet from a remote server;
   determining, by the network interface module, whether the packet conforms to a specific format by determining whether the packet is a Wake-on-LAN packet and comprises a firmware update command;
   if the packet is the Wake-on-LAN packet and comprises the firmware update command, not triggering the microcontroller to wake up the electronic apparatus but triggering, by the network interface module, the microcontroller to update the firmware, and obtaining, by the microcontroller, firmware update data provided by the remote server through the network interface module; and
   refreshing, by the microcontroller, firmware stored in the firmware storage device by using the firmware update data,
   wherein the firmware comprises a basic input/output system, and the microcontroller comprises an embedded controller configured to manage a power state of a computer system.

8. The firmware update method according to claim 7, wherein while the electronic apparatus operates in a power saving state, the electronic apparatus receives the packet by the network interface module.

9. The firmware update method according to claim 8, wherein the step of determining whether the packet conforms to the specific format by the network interface module by determining whether the packet is the Wake-on-LAN packet and comprises the firmware update command comprises:
   determining whether the packet is the Wake-on-LAN packet; and
   if the packet is the Wake-on-LAN packet, determining whether the packet comprises the firmware update command.

10. The firmware update method according to claim 9, further comprising:
    if the packet is the Wake-on-LAN packet and does not comprise the firmware update command, controlling, by the microcontroller, the electronic apparatus to switch from operating in the power saving state to operating in a working state.

11. The firmware update method according to claim 9, wherein the step of obtaining the firmware update data provided by the remote server by the microcontroller through the network interface module if the packet is the Wake-on-LAN packet and comprises the firmware update command comprises:
    if the packet is the Wake-on-LAN packet and comprises the firmware update command, continuing to receive, by the network interface module, the firmware update data provided by the remote server; and
    by the network interface module, providing the firmware update data to the microcontroller.

12. The firmware update method according to claim 9, wherein the step of obtaining the firmware update data provided by the remote server by the microcontroller through the network interface module if the packet is the Wake-on-LAN packet and comprises the firmware update command further comprises:
    if the packet is the Wake-on-LAN packet and comprises the firmware update command, verifying the packet by the microcontroller; and
    if the packet passes the verification, continuing to receive, by the network interface module, the firmware update data provided by the remote server.

13. The firmware update method according to claim 12, wherein the step of verifying the packet by the microcontroller comprises:
- obtaining, by the microcontroller, verification data in the packet and reading a firmware verification code from the firmware; and
- determining, by the microcontroller, whether the firmware verification code matches the verification data in the packet.

\* \* \* \* \*